United States Patent [19]

Baumann et al.

[11] Patent Number: 5,657,158
[45] Date of Patent: Aug. 12, 1997

[54] MICROSCOPE HAVING AN OBJECTIVE CORRECTED TO INFINITY

[75] Inventors: Hans-Georg Baumann, Jena; Hubert Wahl, Stadtroda; Peter Kühn, Jena, all of Germany

[73] Assignee: Carl Zeiss Jena GmbH, Jena, Germany

[21] Appl. No.: 631,363

[22] Filed: Apr. 12, 1996

[30] Foreign Application Priority Data

Apr. 12, 1995 [DE] Germany ............... 195 13 870.8

[51] Int. Cl.⁶ ............ G02B 21/20; G02B 21/36; G02B 23/04
[52] U.S. Cl. ............. 359/363; 359/384; 359/793; 359/795; 359/375
[58] Field of Search ............... 359/363, 368, 359/384, 375–377, 793, 795

[56] References Cited

U.S. PATENT DOCUMENTS

| 2,132,122 | 10/1938 | Ott . | |
|---|---|---|---|
| 2,138,665 | 11/1938 | Ott | 359/384 |
| 3,106,129 | 10/1963 | Frenk et al. | 359/363 |
| 3,565,512 | 2/1971 | Peck | 359/656 |
| 4,365,871 | 12/1982 | Muchel | 359/656 |
| 4,448,498 | 5/1984 | Muller et al. | 359/363 |
| 4,576,450 | 3/1986 | Westphal . | |
| 4,643,541 | 2/1987 | Matsubara . | |
| 4,783,160 | 11/1988 | Tanaka | 359/363 |
| 4,798,451 | 1/1989 | Fujiwara . | |
| 5,000,548 | 3/1991 | Mercado | 359/656 |
| 5,046,834 | 9/1991 | Dietrich | 359/381 |
| 5,121,255 | 6/1992 | Hayashi | 359/656 |
| 5,530,587 | 6/1996 | Sander et al. | 359/376 |

FOREIGN PATENT DOCUMENTS

| 0627642 | 12/1994 | European Pat. Off. . |
| 1098233 | 8/1961 | Germany . |
| 7931427 | 2/1980 | Germany . |
| 218692 | 2/1985 | Germany . |
| 3334690 | 4/1985 | Germany . |

*Primary Examiner*—Jon W. Henry
*Attorney, Agent, or Firm*—Walter Ottesen

[57] ABSTRACT

The invention is directed to a microscope having an objective corrected to infinity and a pivotable binocular viewing unit. A tube lens is arranged downstream of the objective. The microscope includes at least one two-lens tube lens having a focal intercept greater than 200 mm as well as a tiltable mirror element and a further deflecting element mounted between the tube lens and the binocular viewing unit.

7 Claims, 3 Drawing Sheets

MICROSCOPE HAVING AN OBJECTIVE CORRECTED TO INFINITY

FIELD OF THE INVENTION

The invention relates to a microscope having an objective corrected to infinity and a tube lens for generating an intermediate image in the intermediate image plane of a binocular viewing unit.

BACKGROUND OF THE INVENTION

Microscopes of this kind are offered as basic equipment by many microscope manufacturers. An inverted and reversed image is provided in the ocular because of the simple configuration which enables transmission of an image via two fixed deflections by a Bauernfeind prism. In this configuration, the movement of the object and of the ocular intermediate-image are mutually opposing and the users of these apparatus have become accustomed thereto.

For ergonomic reasons, there is a need for the user to have the viewing elevation and viewing angle so as to be changeable. For this purpose, many solutions for microscopes having objectives corrected to form an image in a finite focal plane are known wherein a variation of viewing elevation and viewing angle is provided. These apparatus have a common mirror surface which is also pivoted by about half of the angle when pivoting the binocular viewing unit containing the ocular. In this connection, reference can be made to German published patent application 3,334,690 as well as German Patent 1,098,233, German patent publication 218,692 and German utility model registration 7,931,427. Reference can also be made to U.S. Pat. Nos. 4,798,451; 4,643,541; and 4,576,450. A binocular viewing unit of this kind, which is configured in a simple manner, is disclosed in European published patent application 0,627,642 for a stereomicroscope; however, here too, the objective is without a tube lens and is corrected to form an image in a finite focal plane.

Except for different basic configurations, all these solutions however have at least one of the following disadvantages:

(a) a high number of optical elements and the complexity associated therewith as well as possible image errors and contrast reduction;

(b) an additional intermediate image which is required because of the long optical path whereby the ocular intermediate image is generated so as to be erect and laterally correct in an unaccustomed manner;

(c) high mechanical complexity because several elements on different axes must be moved coupled to each other and at precise angles;

(d) a tube factor of greater than 1 because the path to the intermediate image is too long; and, (e) the inability to realize an output for a camera in a simple manner.

One problem in this context is that conventional single-lens tube lenses, which are adapted to the microscope, have a focal length in the range of approximately 160 to 200 mm with a body magnification of 1 being pregiven. This relatively high focal length is countered by the requirement that an adapter between the body tube of the microscope and the camera should be realized with the shortest structural length possible.

The focal intercept (approximately 160 mm) of the tube lenses which are conventional for this type of microscope does not permit the image to be transmitted into the intermediate image plane when additional optical planar surfaces such as mirrors or prisms are required for pivoting the binocular viewing unit.

SUMMARY OF THE INVENTION

In view of the foregoing, it is an object of the invention to enable the viewing elevation and viewing angle of the binocular viewing unit holding the oculars to be changed and nonetheless maintain the total number of optically effective surfaces and mechanical rotational axes at a minimum. It is a further object of the invention to maintain the image position which is customary for the basic equipment, that is, inverted and reversed. It is still another object of the invention that the tube lens unit directly downstream of the objective have a magnification (tube factor) of 1 without intermediate imaging and to realize a compact camera adapter in a simple manner. The configuration of the invention is compact and space saving.

The microscope of the invention is for viewing an object and includes: an objective defining an optical axis and conducting a light beam coming from the object; the objective being corrected to infinity; a frame; a binocular viewing unit pivotally mounted on the frame so as to pivot through a predetermined angle relative to the frame; a tube lens unit mounted on the frame and arranged on the optical axis downstream of the objective as seen in the direction of the light beam; the tube lens unit including at least a first lens and a second lens arranged on said optical axis and having a focal intercept of greater than 200 mm; a first deflecting element mounted downstream of the tube lens unit for deflecting at least a component beam of the beam out of the optical axis; and, a second deflecting element pivotally mounted on the frame for deflecting the component beam into the binocular viewing unit.

A pivotal binocular viewing unit is realized with the microscope of the invention for which only two deflections and one rotational axis are adequate and wherein a magnification of 1 is nonetheless maintained without it being necessary to generate an intermediate image.

For this purpose, the deflection element (fixed or switchable) is configured as a mirror or a deflecting prism if a simple binocular viewing unit per se is desired or as a partially-transmitting mirror or splitting cube if a binocular tube with a camera adapter is desired in addition to the simple binocular viewing unit.

The tiltable mirror is entrained in a manner known per se via suitable gearing and tilts by an angular amount half of the tilt of the binocular viewing unit as disclosed, for example, in U.S. Pat. No. 2,132,122 incorporated herein by reference.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
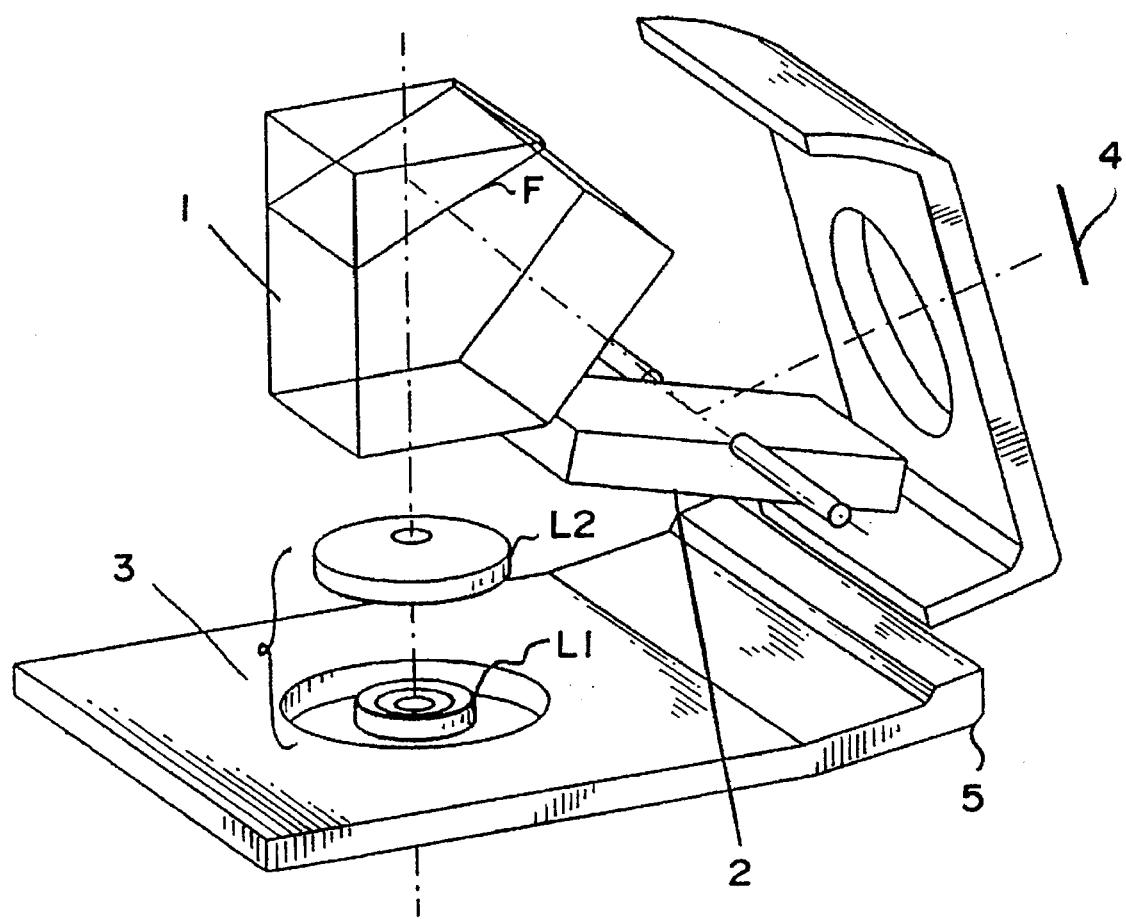
FIG. 1 is a schematic perspective view of a first embodiment of the microscope of the invention.
Figure 2:
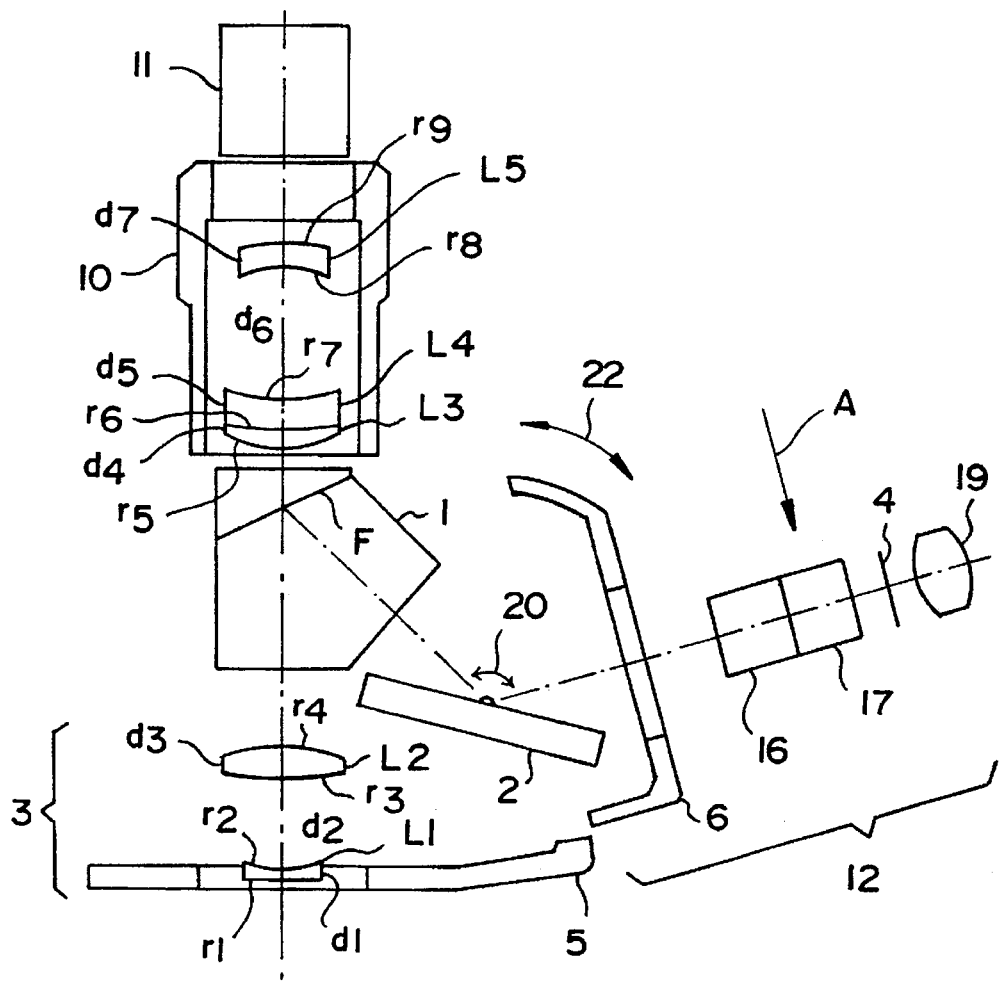
FIG. 2 is a side elevation schematic view of the microscope shown in FIG. 1 equipped with an adapter for a camera.

A tube lens unit 3 includes the lenses L1 and L2 and is mounted on a tube support 5 downstream of the microscope objective 7 (see FIG. 2). The objective 7 defines an optical axis 22 and conducts a light beam coming from an object (not shown) and the lenses L1 and L2 are arranged on this axis.

A deflection prism 1 includes a partially-transmitting face F at which the light beam coming from an object is split into a first component beam and a second component beam. The first component beam is deflected at the face F and the second component beam passes through the face F to a camera adapter 10 mounted downstream of the partially-transmitting face F. The camera adapter 10 comprises three lenses L3, L4 and L5. A camera 11 is shown mounted on the adapter 10 in FIG. 2.

Figure 3:
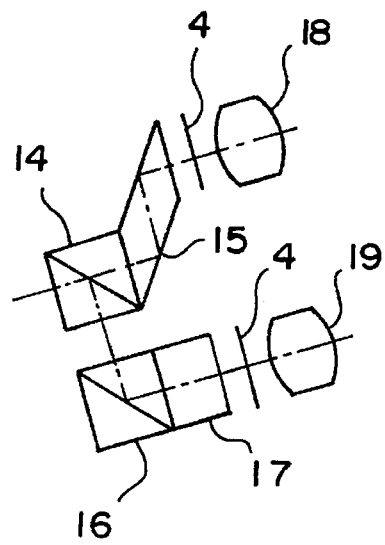
FIG. 3 is a schematic plan view of the binocular viewing unit of the microscope of FIG. 2 as seen in the direction of arrow A thereof; and, FIG. 4 is a schematic of a further embodiment of the microscope of the invention also equipped with an adapter.

After being deflected at face F, the first component beam reaches the intermediate image plane 4 of the oculars via a tilt mirror 2 and the support 6 of a binocular viewing unit 12. As shown in FIG. 3, the binocular viewing unit 12 includes a beam splitter 14 for splitting the first component beam deflected by tilt mirror 2 into first and second subcomponent beams for respective ones of the oculars 18 and 19. The first subcomponent beam passes via deflecting prism 15 to ocular 18 and the second subcomponent beam is deflected by deflecting cube 16 into glass cube 17 and then to ocular 19.

The tilt mirror 2 is coupled so as to pivot (arrow 20) with the pivoting movement of the binocular viewing unit 12 and tilts by half the pivot angle of the binocular viewing unit 12. The tilting movement of binocular viewing unit 12 is schematically represented by double arrow 22. This tilting movement and associated coupling of the tilt mirror is well known in the art and is described, for example, in U.S. Pat. No. 2,132,122, incorporated herein by reference.

The binocular tube assembly includes the binocular viewing unit 12, tilt mirror 2, prism 1 and tube lens unit 3 and has a tube length which extends from binocular viewing unit 12 to the tube lens unit 3. The binocular tube assembly includes the tube lens unit 3 in order to adapt the assembly to the tube length and should not affect the overall magnification of the microscope. For this reason, the tube lens unit 3 has a magnification of one (1).

The tube lens unit 3 (lenses L1 and L2) generates the required long intercept distance (focal intercept) for the visual output in that the two lenses L1 and L2 are so configured that the amounts of the individual focal lengths thereof are 0.4±0.05 of the total focal length (that is, the focal length of the composite of lenses L1 and L2). The first lens L1 (viewed in the direction of light) is a diverging lens made of flint glass having a refractive index of 1.55±0.05 and an Abbe number of 43 to 47 and the lens L2 is a converging lens made of crown glass of Abbe number 65 to 69 and the distance of the mutually adjacent principal planes is 0.15 to 0.19 of the total focal length of the tube lens unit 3.

In this way, and except for the image plane displacement, an excellent image correction is obtained, that is, axial and off-axis image errors such as chromatic aberration and spherical aberration in the image center, color magnification difference, distortion, coma, and astigmatism up to the field edge are eliminated.

The binocular viewing unit 12 is configured to have the longest possible focal intercept. In contrast, adapter 10 is configured to have the shortest possible focal intercept in order to keep its overall structural length, measured along the optical axis, at a minimum.

Furthermore, with the given individual focal lengths, the Petzval sum is zero as a condition for field flattening. The lens system L3 to L5 of adapter 10 functions to realize the conventional coupling dimension for the camera output and generates a short focal intercept by displacing the common principal plane. The common principal plane here is the plane common to the entire lens system (L3, L4 and L5) of the adapter 10. The common principal plane lies forward of the intermediate image and is that plane in which the image side principal point is disposed. The principal plane in the following embodiment lies forward of lens L3.

A first element (L3, L4) is a converging composite lens having the focal length of 1.1 to 1.2 of the total focal length and the second element L5 is at least one diverging individual lens made of crown glass having the refractive index of 1.48 to 1.53 with the Abbe number 68 to 72 and a focal length of 0.5 to 0.6 of the total focal length. The principal plane spacing is 0.18 to 0.22 of the total focal length. In this way, the same imaging quality is obtained as at the visual output.

The principal plane spacing here is the spacing between the principal plane of composite lens (L3, L4) and the principal plane of the individual lens L5. The intermediate image generated by the adapter 10 lies in the spacing of the focal intercept which is in the plane of the film of the camera 11.

The following table provides data on an advantageous embodiment of the lens systems (L1, L2) as well as (L3 to L5). The intercept distance here is 238 mm.

| Lens | Glass Type | Radius of Curvature | Distance (mm) |
| --- | --- | --- | --- |
| L1 | LLF1 | r1 = infinite<br>r2 = 34.475 | d1 = 2.5 |
| L2 | BK10 | r3 = 124.099<br>r4 = −44.342 | d2 = 26.4<br>d3 = 4.0 |
| L3 | FK5 | r5 = 24.939<br>r6 = 87.217 | d4 = 4.2 |
| L4 | BaF52 | r7 = 33.741 | d5 = 5.9<br>d6 = 30.9 |
| L5 | FK5 | r8 = −18.970<br>r9 = −34.975 | d8 = 4.5 |

Figure 4:
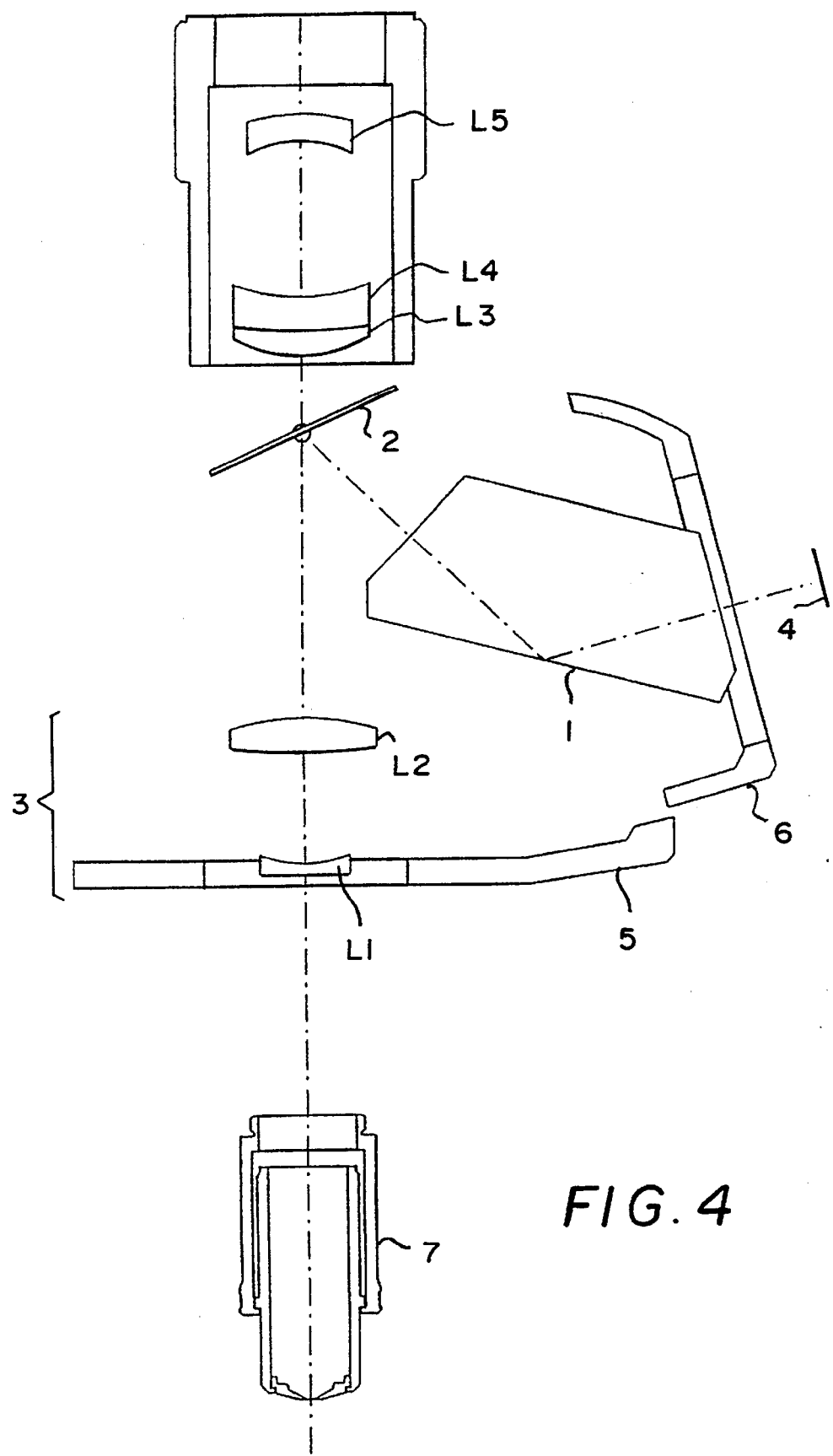

In FIG. 4, a tilt mirror 2 is mounted in the beam path downstream of the tube lens unit 3. The tilt mirror 2 is configured so as to be partially transmitting for generating a camera beam path with the lens system of the invention. The deflecting prism 1 follows the tilt mirror 2. In this case, the prism executes a movement coupled directly to the movement of the support 6 of the binocular viewing unit (not shown in FIG. 4). Reference numeral 7 identifies the microscope objective of the microscope.

It is understood that the foregoing description is that of the preferred embodiments of the invention and that various changes and modifications may be made thereto without departing from the spirit and scope of the invention as defined in the appended claims.

What is claimed is:

1. A microscope for viewing an object comprising:
   an objective defining an optical axis and conducting a light beam coming from the object;
   said objective being corrected to infinity;
   a frame;
   a binocular viewing unit pivotally mounted on said frame so as to pivot through a predetermined angle relative to said frame;
   a tube lens unit mounted on said frame and arranged on said optical axis downstream of said objective as seen in the direction of said light beam;

said tube lens unit including at least a first lens and a second lens arranged on said optical axis and having a focal intercept of greater than 200 mm;

a first deflecting element mounted downstream of said tube lens unit for deflecting at least a component beam of said beam out of said optical axis; and, a second deflecting element pivotally mounted on said frame for deflecting said component beam into said binocular viewing unit.

2. The microscope of claim 1, wherein said first deflecting element is a deflecting prism and said second deflecting element is a tiltable mirror.

3. The microscope of claim 2, further comprising:

an adapter for interfacing a camera with said microscope;

said adapter being arranged on said optical axis downstream of said deflecting prism;

said component beam being a first component beam and said deflecting prism having a partially-transmitting surface whereat said light beam is split to form said first component beam deflected toward said mirror and a second component beam passing through said partially-transmitting surface along said optical axis and into said adapter; and, said adapter including first and second lenses for transmitting said second component beam into the camera.

4. The microscope of claim 1, wherein said first deflecting element is a tiltable mirror and said second deflecting element is a deflecting prism.

5. The microscope of claim 4, further comprising:

an adapter for interfacing a camera with said microscope;

said adapter being arranged on said optical axis downstream of said tiltable mirror;

said component beam being a first component beam and said tiltable mirror being a partially-transmitting mirror whereat said light beam is split to form said first component beam deflected toward said deflecting prism and a second component beam passing through said partially-transmitting mirror along said optical axis and into said adapter; and, said adapter including first and second lenses for transmitting said second component beam into the camera.

6. The microscope of claim 1, said tube lens unit including first and second lenses having first and second individual focal lengths and said first and second lenses conjointly defining a total focal length; said first and second lenses being so configured that said individual focal lengths are each 0.4±0.05 of said total focal length; said first lens being the first lens in said direction of said light beam and said first lens being a diverging lens made of flint glass having a refractive index of 1.55±0.05 and an Abbe number in the range of 43 to 47; and, said second lens being a converging lens made of crown glass having an Abbe number in the range of 65 to 69; and, said first and second lenses defining mutually adjacent respective principal planes conjointly defining a spacing therebetween corresponding to 0.19 of said total focal length.

7. The microscope of claim 3, said adapter including a first lens having a first focal length and a second lens having a second focal length; said first and second lenses conjointly defining a total focal length; said first and second lenses defining mutually adjacent respective principal planes which are shifted to provide a short focal intercept in that said first lens is a converging composite lens with said first focal length being 1.1 to 1.2 of said total focal length and said second lens is a diverging lens made of crown glass having a refractive index of 1.48 to 1.53 and an Abbe number in the range of 68 to 72 and said second focal length being 0.5 to 0.6 of said total focal length; and, said principal planes conjointly defining a spacing therebetween corresponding to 0.18 to 0.22 of said total focal length.

* * * * *